(12) United States Patent
Park

(10) Patent No.: US 7,511,873 B2
(45) Date of Patent: Mar. 31, 2009

(54) ELECTRODE STRUCTURE OF ELECTROCHROMIC DEVICE

(75) Inventor: Kee Yong Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 163 days.

(21) Appl. No.: 11/590,753

(22) Filed: Nov. 1, 2006

(65) Prior Publication Data

US 2007/0097483 A1  May 3, 2007

(30) Foreign Application Priority Data

Nov. 2, 2005  (KR) .................. 10-2005-0104489

(51) Int. Cl.
*G02B 26/00* (2006.01)
(52) U.S. Cl. .................. 359/271; 359/266; 359/269
(58) Field of Classification Search .......... 359/265, 359/266, 267, 268, 269, 270, 271, 272, 273, 359/274, 275
See application file for complete search history.

(56) References Cited

U.S. PATENT DOCUMENTS 6,791,737 B2 *  9/2004  Giron .................. 359/265
6,822,778 B2 * 11/2004  Westfall et al. ........ 359/265

* cited by examiner

*Primary Examiner*—Hung X Dang
*Assistant Examiner*—Tuyen Q Tra
(74) *Attorney, Agent, or Firm*—McKenna Long & Aldridge LLP

(57) ABSTRACT

Disclosed is an electrochromic device including at least one display region and at least one non-display region, which are separated from each other, the electrochromic device including a first substrate, a first electrode, an electrochromic layer, an electrolyte layer, optionally an ion storage layer, a second electrode, and a second substrate, which are sequentially formed, wherein the ion storage layer and/or the second electrode are patterned so as to prevent the ion storage layer and/or the second electrode from existing in part or all of said at least one display region; and a display device including the electrochromic device. In the electrochromic device, only the second substrate and electrolyte layer are located between the observer and the electrochromic layer, so that it is possible to prevent a contrast ratio from being degraded due to the ion storage layer and/or second electrode.

20 Claims, 4 Drawing Sheets

(a)

(b)

(c)

ELECTRODE STRUCTURE OF ELECTROCHROMIC DEVICE

This application claims the benefit of the filing date of Korean Patent Application No. 2005-104489, filed on Nov. 2, 2005, in the Korean Intellectual Property Office, the disclosure of which is incorporated herein in its entirety by reference.

TECHNICAL FIELD

The present invention relates to an electrochromic device, the color of which changes in response to an electric signal applied to the electrochromic device, and a display device including the electrochromic device.

BACKGROUND ART

In general, display devices are broadly classified into light-emitting display devices, such as a cathode ray tube (CRT), a plasma display panel (PDP), a light-emitting diode (LED), and an organic light-emitting diode (OLED), and non-emissive display devices such as a liquid crystal display (LCD). The former has a disadvantage in that a displayed image is vaguely shown in a light space although it has a fast response speed, and the latter has a disadvantage in that the response speed thereof is slow although a displayed image is clearly shown in the light space. Among these display devices, an electrochromic device (ECD) is a type of non-emissive display device, like the LCD. The electrochromic device is a display device which adjusts the color of electrochromic material by controlling a chemical reaction through the application of an electric signal.

Meanwhile, FIG. 1 is a cross-sectional view schematically illustrating the basic structure of an electrochromic device. Referring to FIG. 1, the electrochromic device 1 includes a first electrode 11 formed on a first glass substrate 10, and a second electrode 16 formed on a second glass substrate 17, in which the first and second electrodes 11 and 16 are spaced while facing each other. In addition, the electrochromic device 1 includes an electrochromic layer 12, an electrolyte layer 13, and an ion storage layer 15. The electrochromic layer 12 is formed on the upper surface of the first electrode 11 and includes electrochromic material, the color of which changes depending on an applied electric signal. The electrolyte layer 13 is formed on the top of the electrochromic layer 12 and includes ions concerned in an electrochromic reaction. The ion storage layer 15 is formed on the second electrode 16 and gathers ions having a polarity opposite to that of the ions concerned in the electrochromic reaction.

Generally, at least one of the first and second electrodes 11 and 16 employs a transparent electrode, for example, an indium-tin oxide (ITO) electrode. The ion storage layer 15 may be omitted.

When forward voltage is applied to the electrochromic device 1 so as to let an electric current flow from the electrochromic layer to the ion storage layer, the electrochromic layer 12 is colored, and when reverse voltage is applied to the electrochromic device 1 so as to let an electric current flow from the ion storage layer to the electrochromic layer, the electrochromic layer 12 is bleached. Meanwhile, according to the material of the electrochromic layer, the electrochromic layer may be colored or bleached by the flow of electric current in the opposite directions.

FIG. 2a is a view illustrating the layout of an electrochromic layer for displaying numbers in a 7-segment pattern, and FIG. 2b is a view illustrating the layout of a conventional electrode for applying an electric signal to the electrochromic layer of FIG. 2a. FIGS. 2a and 2b show an example of a direct-driving type electrochromic display device in which separate electrodes are connected to each segment or each pixel, respectively.

Meanwhile, an active-matrix-driving type electrochromic display device is constructed, for example, such that a number of electrochromic pixels are mounted on a panel equipped with a switching element for each pixel. Since the on/off operation of each pixel in such an electrochromic display device is independently controlled, the electrochromic display device has advantages in that it can realize a relatively higher image quality and a relatively faster response speed, and has excellent resolution and moving picture realization capability. In this case, it is well known that a thin film transistor (TFT) is used as the switching element.

FIG. 3a is a view illustrating the structure of an electrode of a thin film transistor in a typical active-matrix-driving type electrochromic device. Herein, an electrode 21 for applying a signal directly to a pixel corresponds to the first electrode 11 of FIG. 1.

FIG. 3b is a cross-sectional view of the thin film transistor shown in FIG. 3a. A direct-driving type device and an active-matrix-driving type device have structures similar to each other, except for a TFT existing beneath the first electrode.

FIG. 3c is a view illustrating the simplest structure obtained when the electrochromic device of FIG. 1 is formed on the TFT of FIG. 3b.

Meanwhile, observer's eyes to the electrochromic device are oriented toward a second substrate 27. Therefore, the observer's eyes need to pass through an ion storage layer 25 and a second electrode 26 in order to see a displayed color. Then, the contrast ratio is degraded as much.

Particularly, when the ion storage layer 25 is a colored layer, a color reproduction rate as well as a contrast ratio is degraded.

DISCLOSURE OF THE INVENTION

Therefore, the present invention has been made in view of the above-mentioned problems, and it is an object of the present invention to prevent a contrast ratio from being degraded due to an ion storage layer and a second electrode when observer's eyes are oriented toward the second substrate in the conventional electrochromic device, in which a first substrate, a first electrode, an electrochromic layer, an electrolyte layer, the ion storage layer, the second electrode, and the second substrate are sequentially formed.

To this end, the present invention provides an electrochromic device having such a structure that only the second substrate and electrolyte layer exist between observer's eyes and the electrochromic layer, by patterning the ion storage layer and/or the second electrode to have a net structure or the like so that all or part of the ion storage layer and/or the second electrode does not exist on a display region where the electrochromic layer exists.

According to an aspect of the present invention, there is provided an electrochromic device including at least one display region and at least one non-display region, which are separated from each other, the electrochromic device comprising a first substrate, a first electrode, an electrochromic layer, an electrolyte layer, a second electrode, and a second substrate, which are sequentially formed, wherein the second electrode is patterned so as to prevent the second electrode from existing in part or all of said at least one display region; and a display device including the electrochromic device.

According to another aspect of the present invention, there is provided an electrochromic device including at least one display region and at least one non-display region, which are separated from each other, the electrochromic device comprising a first substrate, a first electrode, an electrochromic layer, an electrolyte layer, an ion storage layer, a second electrode, and a second substrate, which are sequentially formed, wherein the ion storage layer and/or the second electrode are patterned so as to prevent the ion storage layer and/or the second electrode from existing in part or all of said at least one display region; and a display device including the electrochromic device.

BRIEF DESCRIPTION OF THE DRAWINGS

The foregoing and other objects, features and advantages of the present invention will become more apparent from the following detailed description when taken in conjunction with the accompanying drawings in which:

FIG. 2b is a view illustrating the layout of a conventional direct-driving type lower electrode for applying an electric signal to the electrochromic layer of FIG. 2a;

FIG. 3a is a view illustrating the structure of an electrode of a thin film transistor in a typical active-matrix-driving type electrochromic device;

FIG. 3b is a cross-sectional view of the thin film transistor shown in FIG. 3a;

FIG. 3c is a view illustrating the structure of an electrochromic device in which the electrochromic device of FIG. 1 is formed on the TFT of FIG. 3b;

BEST MODE FOR CARRYING OUT THE INVENTION

Reference will now be made in detail to the preferred embodiments of the present invention.

The characteristic of the present invention is to pattern a second electrode and/or an ion storage layer such that the second electrode and/or the ion storage layer does not exist on all or part of a display region where an electrochromic layer exists.

According to the electrochromic device having the characteristic based on the present invention, only a second substrate and an electrolyte layer are located between an observer and an electrochromic layer, so that it is possible to prevent a contrast ratio from being degraded due to an ion storage layer and/or a second electrode.

In the description of the present invention, the term "display region" refers to a region where an electrochromic layer exists, and the term "non-display region" refers to a region where no electrochromic layer exists.

Figure 1:
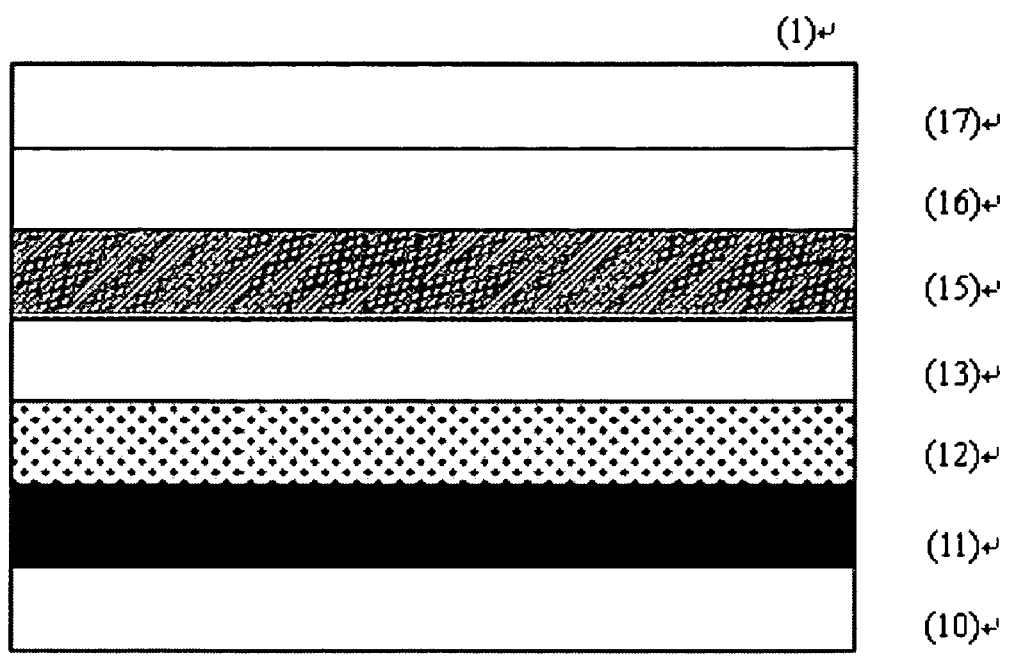
FIG. 1 is a cross-sectional view schematically illustrating the basic structure of a conventional electrochromic device.
Figure 2A:
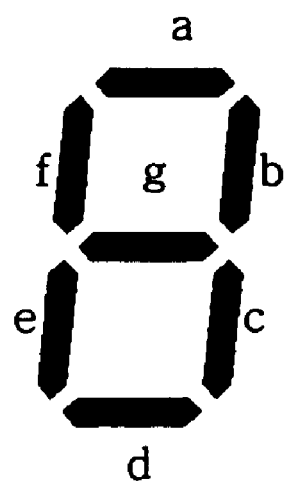
FIG. 2a is a view illustrating the layout of an electrochromic layer for displaying numbers in a 7-segment pattern.
Figure 2B:
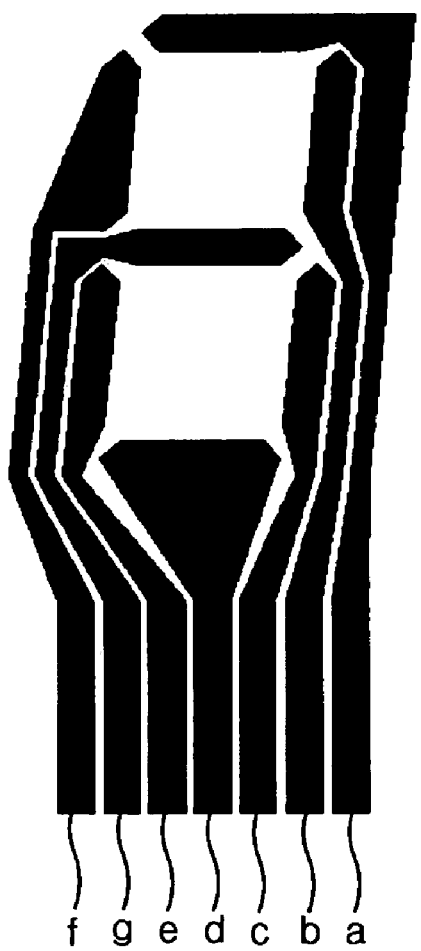
Figure 3:
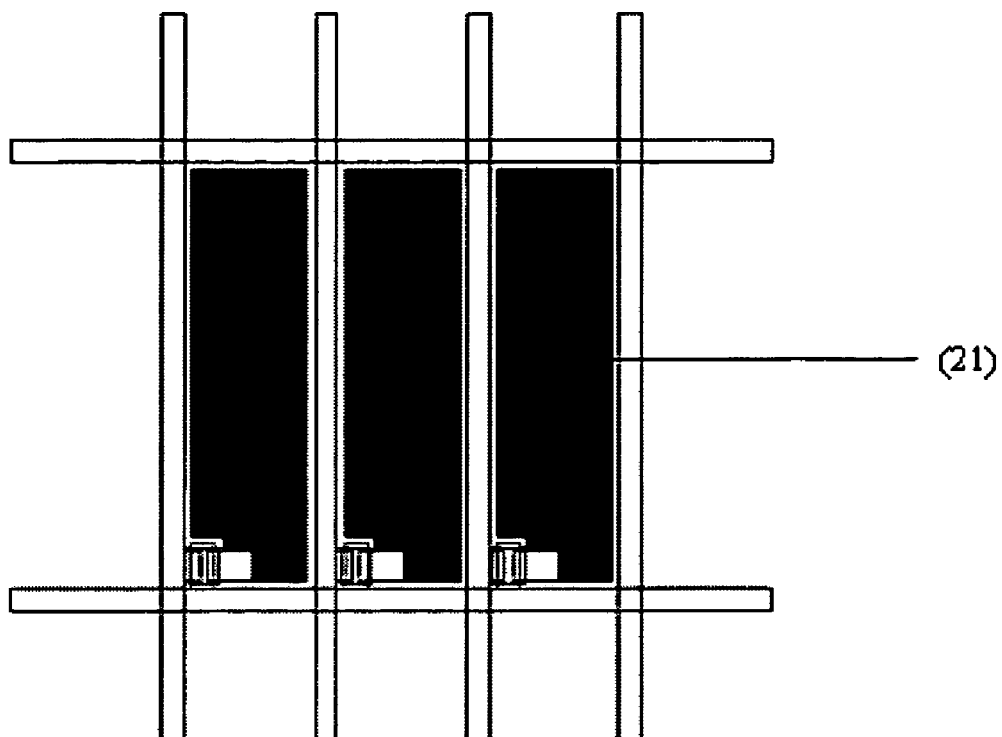
Figure 3:
Figure 3:
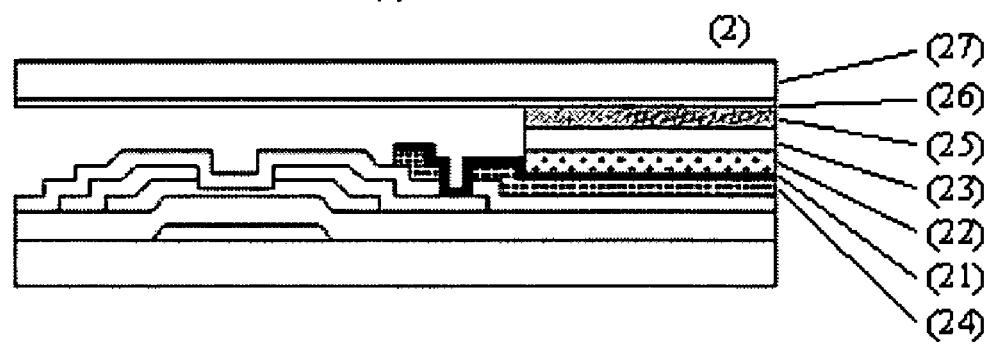
Figure 4:
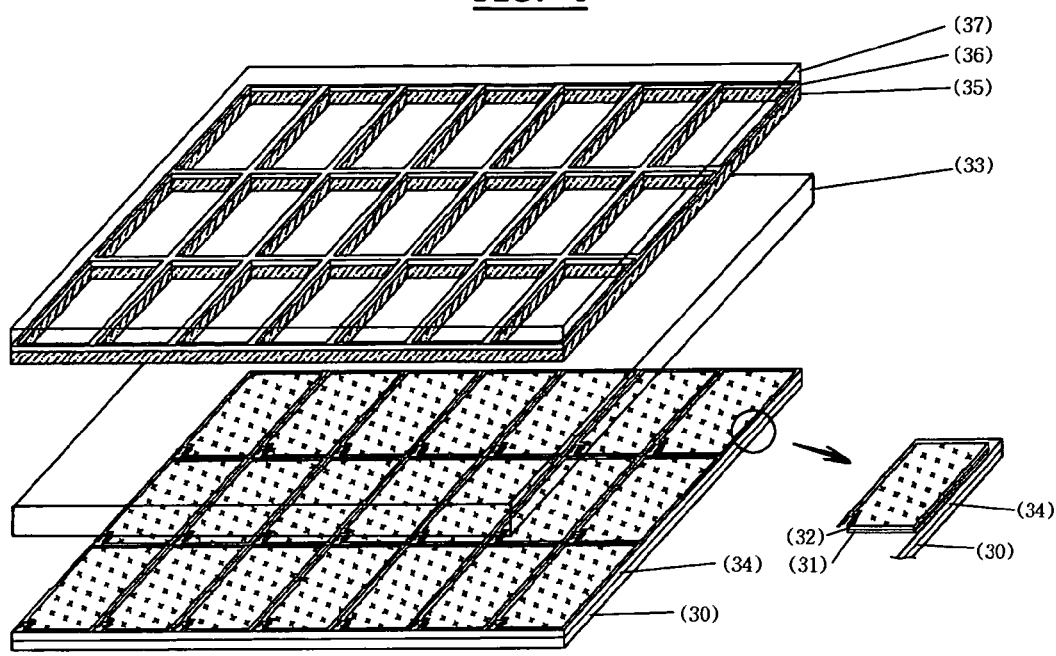
FIG. 4 is an exploded perspective view illustrating an electrochromic device in which the second electrode and the ion storage layer are patterned in a net shape according to an embodiment of the present invention.

FIG. 4 is a view illustrating an example in which the structure of an electrochromic device according to an embodiment of the present invention is applied to an active-matrix-driving scheme. The conception of the present invention is not limited to the active-matrix-driving scheme as long as the electrochromic device includes at least one display region and at least one non-display region.

The structure of an electrochromic display panel according to an embodiment of the present invention will now be described with reference to FIG. 4.

Generally, an active-matrix-driving type electrochromic display panel includes a first substrate 30, a second substrate 37, and an electrochromic layer 32 filled between the first and second substrates 30 and 37. Each of the first substrate 30 and the second substrate 37 has an electric field generation electrode at a surface thereof opposed to the other.

The first substrate 30 includes a plurality of parallel gate lines and a plurality of parallel data lines on a transparent substrate such as a glass substrate, which are aligned to cross each other lengthwise and breadthways, thereby defining pixel regions "P" of a net shape, wherein the gate lines output respective injection voltages, and the data lines output image voltages. In addition, a thin film transistor "T" is mounted at each crossing position between the gate and data lines, and first electrodes 31 one-to-one connected to the thin film transistors "T" for each pixel region "P" are mounted.

In this case, the first electrode 31 functions to apply a voltage to the electrochromic layer 32, that is, functions as an electric field generation electrode, wherein a portion where the first electrode 31 and/or electrochromic layer 32 exist becomes a display region of the electrochromic display panel, and the other portion becomes a non-display region. In addition, the thin film transistor "T" is turned on/off by a signal voltage output through the gate line, so as to function as a switching element which selectively applies a signal voltage output through the data line to the first electrode 31.

Also, the second electrode 36 functioning as the other electric field generation electrode is mounted on the second substrate 37.

In detail, the electrochromic device illustrated in FIG. 4 includes: a first substrate 30, which contains a passivation layer formed for each TFT; a reflection layer 34 formed on the top of the first substrate; a first electrode 31 formed on the top of the reflection layer; an electrochromic layer 32 which is formed on the top of the first electrode and includes electrochromic material that changes the color thereof depending on an applied electric signal; an electrolyte layer 33 which is formed on the top of the electrochromic layer 32 and includes ions concerned in an electrochromic reaction; an ion storage layer 35 which is formed on the top of the electrolyte layer and gathers ions having a polarity opposite to that of the ions concerned in the electrochromic reaction; a second electrode 36 which is formed on the top of the ion storage layer and provides electric charges to the ion storage layer; and a second substrate 37 formed at the top position of the electrochromic device. One first electrode is mounted for each display region, and is connected to a switching element (e.g., TFT) for controlling the on/off operation of the corresponding display region.

In this case, each of the first substrate, the electrolyte layer, the ion storage layer, the second electrode, and the second substrate may be formed as a single layer in spatial commonality throughout all of at least one display regions/non-display regions. Also, the electrolyte layer, the ion storage layer, and the second electrode may be patterned upon each pixel.

At least one of each of the first electrode and the electrochromic layer exists in each display region.

Figure 5:
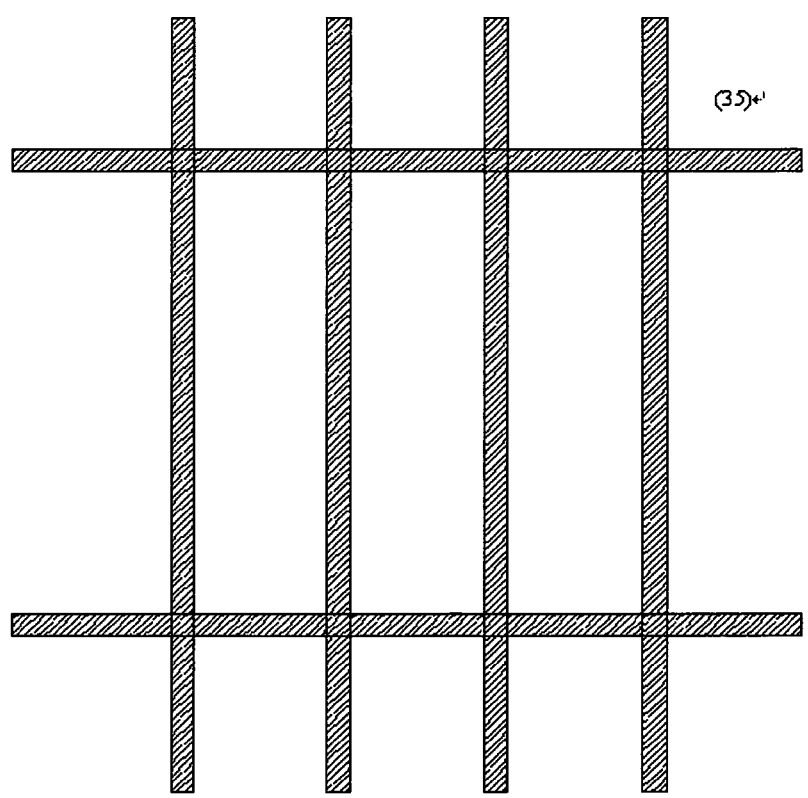
FIG. 5 is a view schematically illustrating the shape of the ion storage layer or the second electrode patterned when the electrochromic device according to an embodiment of the present invention is applied to an active-matrix-driving scheme.

According to the present invention, the second electrode and/or the ion storage layer are patterned to have a net structure, as shown in FIG. 5, so that the second electrode and/or the ion storage layer may exist only in non-display regions, as much as possible, where an electrochromic layer does not exist, that is, so that the second electrode and/or the ion storage layer may have empty spaces, in order to prevent the electrochromic layer from being screened by the second electrode and/or the ion storage layer having low transparency, which are located between the electrochromic layer and observer's eyes. The patterning is not limited to the shape shown in FIG. 5, and may be patterned to have various formats.

When the openings of the ion storage layer 35 having a net structure coincide with the pixel portion of the electrochromic layer 32, it is possible to minimize a pixel portion which is hidden in view from the front side thereof. Such a manner enables the observer to better view the electrochromic device in a specific direction. The second electrode 36 located at an upper position may also be patterned in the same manner.

Meanwhile, the ion storage layer 35 between the second electrode 36 and the electrolyte layer 33 may be omitted.

Also, according to the present invention, the second electrode and the ion storage layer are not located between the observer and the electrochromic layer, so it is unnecessary to satisfy a transparency condition.

While FIG. 4 shows a case in which the first electrode is connected to a TFT, the first electrode may be connected directly to an external driving circuit in the case of using a direct-driving scheme.

Electrochromic material may be a semiconductor oxide deposited as a sequential layer on an electrode coated on a substrate, thereby forming an electrochromic layer. Representative electrochromic material includes inorganic metal oxides such as a tungsten oxide ($WO_3$), a Nickel oxide (NiO), and a Titanium oxide ($TiO_2$), and organic material such as bipyridinium salt (viologen) derivatives, quinone-based derivatives (for example, antraquinone), and azine-based derivatives (for example, phenothiazine).

The first and second electrodes may be formed by using transparent electrodes, such as ITO or FTO, but the present invention is not limited thereto.

Electrolyte may be in various phases such as liquid, solid, etc., and the electrolyte layer may be replaced by an ionic liquid layer containing ionic liquid.

The ion storage layer may be formed by using metal oxide nanoparticles such as antimony-doped tin oxide (ATO), or electrochromic material having a polarity opposite to that used for the first electrode.

In the electrochromic device according to the present invention, a reflection layer may be additionally formed on the inside or outside of the electrochromic device. In the electrochromic device according to the present invention, the observer's eyes are oriented toward the second substrate 37. Therefore, when a white background is required, the reflection layer 34 must be formed beneath or below the electrochromic layer 32.

In the electrochromic device according to the present invention, electric current flows along the electrochromic layer, the first electrode, a driving circuit, the second electrode, and the ion storage layer (herein, the ion storage layer may be excluded); the ions in the electrolyte move; and a chemical reaction is generated and/or an electric current flows between the electrolyte layer and the first electrode, electrochromic layer, second electrode, and ion storage layer (herein, the ion storage layer may be excluded).

When forward voltage is applied to the electrochromic device 3 so as to let an electric current flow from the ion storage layer 35 to the electrochromic layer 32, the electrochromic layer 32 is colored, and when reverse voltage is applied to the electrochromic device 3 so as to let an electric current flow from the electrochromic layer 32 to the ion storage layer 35, the electrochromic layer 32 is bleached. Meanwhile, according to the material of the electrochromic layer, the electrochromic layer may be colored or bleached by the flow of electric current in the opposite directions.

In the electrochromic device, the ion storage layer, the reflection layer, and the passivation layer may be omitted according to circumstances.

When a reflection layer having a white background is disposed beneath a TFT substrate i.e., on the outside of the cell (on the outside of the electrochromic device), an electrochromic device manufacturing process can be further simplified.

Meanwhile, the larger the area occupied by the electrochromic layer is, the clearer the color displayed in a panel becomes. In order to obtain excellent display performance, the quantities of electric charges stored in the electrochromic layer 32 and the ion storage layer 35 must be similar to each other, which is influenced by material, and each layer's area and thickness.

Therefore, it is preferred to reduce the area of the ion storage layer by forming the ion storage layer to be thicker than the electrochromic layer so that the electrochromic layer actually expressing color can have a relatively larger area.

Also, it is preferred that an ion storage layer is formed in an empty space not occupied by the electrochromic layer, so as to increase the area of the electrochromic layer.

In addition, the electrochromic device according to the present invention may be used to construct a display device. Particularly, when the electrochromic device according to the present invention is employed in a direct-driving type or active-matrix-driving type display device, it is possible to improve the performance of the display device through a simple manufacturing process. For example, the present invention can achieve an electrochromic display device which provides clear display even when the transparency of the ion storage layer 25 and upper electrode 26 is reduced, with a process similar to the conventional process.

INDUSTRIAL APPLICABILITY

As can be seen from the foregoing, according to the electrochromic device of the present invention, only the second substrate and electrolyte layer are located between the observer and the electrochromic layer, so that it is possible to prevent a contrast ratio from being degraded due to the ion storage layer and/or second electrode.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. An electrochromic device including at least one display region and at least one non-display region, which are separated from each other, the electrochromic device comprising:
a first substrate, a first electrode, an electrochromic layer, an electrolyte layer, a second electrode, and a second substrate, which are sequentially formed,
wherein the second electrode is patterned so as to prevent the second electrode from existing in part or all of said at least one display region.

2. The electrochromic device as claimed in claim 1, wherein the display region corresponds to a region in which the electrochromic layer exists.

3. The electrochromic device as claimed in claim 1, wherein the second electrode or the ion storage layer is patterned in a net structure.

4. The electrochromic device as claimed in claim 1, wherein an empty region within the patterned second electrode or ion storage layer has a shape which coincides with a pixel shape of the electrochromic layer.

5. The electrochromic device as claimed in claim 1, wherein the electrolyte layer is an ionic liquid layer which contain ions concerned in an electrochromic reaction.

6. The electrochromic device as claimed in claim 1, wherein the first electrode is connected directly to an external driving circuit.

7. The electrochromic device as claimed in claim 1, wherein the first electrode is formed on a thin film transistor.

8. The electrochromic device as claimed in claim 1, wherein a reflection layer is formed on the inside or outside of the electrochromic device.

9. A display device comprising the electrochromic device as claimed in claim 1.

10. The display device as claimed in claim 9, wherein the electrochromic device is driven either in a direct-driving scheme or in an active-matrix-driving scheme.

11. An electrochromic device including at least one display region and at least one non-display region, which are separated from each other, the electrochromic device comprising:

a first substrate, a first electrode, an electrochromic layer, an electrolyte layer, an ion storage layer, a second electrode, and a second substrate, which are sequentially formed, wherein the ion storage layer and/or the second electrode are patterned so as to prevent the ion storage layer and/or the second electrode from existing in part or all of said at least one display region.

12. The electrochromic device as claimed in claim 11, wherein the display region corresponds to a region in which the electrochromic layer exists.

13. The electrochromic device as claimed in claim 11, wherein the second electrode or the ion storage layer is patterned in a net structure.

14. The electrochromic device as claimed in claim 11, wherein an empty region within the patterned second electrode or ion storage layer has a shape which coincides with a pixel shape of the electrochromic layer.

15. The electrochromic device as claimed in claim 11, wherein the ion storage layer is thicker than the electrochromic layer, so as to increase an area occupied by the electrochromic layer.

16. The electrochromic device as claimed in claim 11, wherein the electrolyte layer is an ionic liquid layer which contain ions concerned in an electrochromic reaction.

17. The electrochromic device as claimed in claim 11, wherein the first electrode is connected directly to an external driving circuit.

18. The electrochromic device as claimed in claim 11, wherein the first electrode is formed on a thin film transistor.

19. The electrochromic device as claimed in claim 11, wherein a reflection layer is formed on the inside or outside of the electrochromic device.

20. A display device comprising the electrochromic device as claimed in claim 11.

* * * * *